(12) United States Patent
Hasegawa et al.

(10) Patent No.: US 11,287,789 B2
(45) Date of Patent: Mar. 29, 2022

(54) PROGRAM DEVELOPMENT SUPPORT DEVICE, PROGRAM DEVELOPMENT SUPPORT SYSTEM, PROGRAM DEVELOPMENT SUPPORT METHOD, AND NON-TRANSITORY COMPUTER-READABLE RECORDING MEDIUM

(71) Applicant: OMRON Corporation, Kyoto (JP)

(72) Inventors: Naoto Hasegawa, Ritto (JP); Shintaro Iwamura, Otsu (JP)

(73) Assignee: OMRON Corporation, Kyoto (JP)

( * ) Notice: Subject to any disclaimer, the term of this patent is extended or adjusted under 35 U.S.C. 154(b) by 198 days.

(21) Appl. No.: 16/603,588

(22) PCT Filed: Feb. 28, 2018

(86) PCT No.: PCT/JP2018/007413
§ 371 (c)(1),
(2) Date: Oct. 8, 2019

(87) PCT Pub. No.: WO2018/220923
PCT Pub. Date: Dec. 6, 2018

(65) Prior Publication Data
US 2021/0088995 A1    Mar. 25, 2021

(30) Foreign Application Priority Data

May 30, 2017  (JP) .............................. JP2017-106948

(51) Int. Cl.
*G05B 19/042* (2006.01)

(52) U.S. Cl.
CPC .................... *G05B 19/0426* (2013.01); *G05B 2219/23258* (2013.01); *G05B 2219/23291* (2013.01); *G05B 2219/23456* (2013.01)

(58) Field of Classification Search
CPC ...... G05B 19/0426; G05B 2219/23258; G05B 2219/23291; G05B 2219/23456; G05B 2219/23283
See application file for complete search history.

(56) References Cited

U.S. PATENT DOCUMENTS

| 6,691,301 | B2 * | 2/2004 | Bowen | G06F 30/30 |
| | | | | 717/114 |
| 7,178,135 | B2 * | 2/2007 | Bates | G06F 11/362 |
| | | | | 714/38.13 |

(Continued)

FOREIGN PATENT DOCUMENTS

| CN | 101071395 | 11/2007 |
| CN | 101216802 | 7/2008 |

(Continued)

OTHER PUBLICATIONS

"Office Action of Japan Counterpart Application", dated Feb. 24, 2021, with English translation thereof, pp. 1-8.

(Continued)

Primary Examiner — Charles R Kasenge
(74) Attorney, Agent, or Firm — JCIPRNET

(57) ABSTRACT

A sequence control program and an HMI control program are synchronized and simulated. A program development support unit includes a calculation unit and a storage unit. A sequence control editing program for achieving a sequence control editing unit, an HMI control editing program for achieving an HMI control editing unit, and an integration simulation management program for achieving an integration simulation management unit are stored in the storage unit. The integration simulation management unit manages the synchronization of simulation of the sequence control program and simulation of the HMI control program. The integration simulation management unit executes variable management process. In the variable management process, (Continued)

common variables are exchanged between the sequence control program and the HMI control program during execution of the simulation of the sequence control program and the simulation of the HMI control program.

12 Claims, 6 Drawing Sheets

(56) References Cited

U.S. PATENT DOCUMENTS

| | | | |
|---|---|---|---|
| 7,257,521 B2* | 8/2007 | Hashima | G05B 19/0426 703/7 |
| 8,806,447 B2* | 8/2014 | Bates | G06F 11/362 717/129 |
| 9,262,299 B1* | 2/2016 | Wilmot | G06F 30/33 |
| 9,588,870 B2* | 3/2017 | Marron | G06F 11/362 |
| 9,898,385 B1* | 2/2018 | O'Dowd | G06F 11/3664 |
| 9,904,615 B1* | 2/2018 | O'Dowd | G06F 11/323 |
| 9,940,220 B2* | 4/2018 | Romm | G06F 11/364 |
| 2001/0016807 A1* | 8/2001 | Hashima | G05B 19/0426 703/22 |
| 2002/0126151 A1 | 9/2002 | Chandhoke et al. | |
| 2002/0199173 A1* | 12/2002 | Bowen | G06F 11/362 717/129 |
| 2003/0028864 A1* | 2/2003 | Bowen | G06F 8/48 717/141 |
| 2003/0115576 A1* | 6/2003 | Bates | G06F 11/362 717/129 |
| 2003/0208746 A1 | 11/2003 | Bates et al. | |
| 2004/0181781 A1 | 9/2004 | Tohdo et al. | |
| 2004/0230954 A1 | 11/2004 | Dandoy | |
| 2005/0289396 A1* | 12/2005 | Hooper | G06F 11/3664 714/34 |
| 2006/0288332 A1* | 12/2006 | Sagar | G06F 11/3664 717/124 |
| 2010/0017185 A1* | 1/2010 | Bade | G06F 30/30 703/13 |
| 2012/0110553 A1* | 5/2012 | Bates | G06F 11/3624 717/129 |
| 2012/0110554 A1* | 5/2012 | Bates | G06F 11/3624 717/129 |
| 2016/0321159 A1* | 11/2016 | Romm | G06F 11/364 |
| 2019/0034075 A1* | 1/2019 | Smochko | G06F 3/04842 |

FOREIGN PATENT DOCUMENTS

| | | |
|---|---|---|
| CN | 102968372 | 3/2013 |
| JP | 2000010769 | 1/2000 |
| JP | 2003044277 | 2/2003 |
| JP | 2008191963 | 8/2008 |
| JP | 2009223471 | 10/2009 |
| JP | 2012194632 | 10/2012 |
| JP | 2014530392 | 11/2014 |
| JP | 2016224558 | 12/2016 |

OTHER PUBLICATIONS

"Search Report of Europe Counterpart Application", dated Jan. 26, 2021, p. 1-p. 8.

"International Search Report (Form PCT/ISA/210) of PCT/JP2018/007413," dated May 15, 2018, with English translation thereof, pp. 1-5.

"Office Action of China Counterpart Application" with English translation thereof, dated Dec. 28, 2021, p. 1-p. 28.

* cited by examiner

PROGRAM DEVELOPMENT SUPPORT DEVICE, PROGRAM DEVELOPMENT SUPPORT SYSTEM, PROGRAM DEVELOPMENT SUPPORT METHOD, AND NON-TRANSITORY COMPUTER-READABLE RECORDING MEDIUM

CROSS-REFERENCE TO RELATED APPLICATION

This application is a 371 application of the International PCT application serial no. PCT/JP2018/007413, filed on Feb. 28, 2018, which claims the priority benefit of Japan Patent Application No. 2017-106948, filed on May 30, 2017. The entirety of each of the abovementioned patent applications is hereby incorporated by reference herein and made a part of this specification.

BACKGROUND OF THE INVENTION

Technical Field

The present invention relates to a program development support technology supporting development of a control program and an HMI (human machine interface) program of a control machine.

Related Art

Many sequence control devices are put into practical use. An indicator including an HMI is connected to this sequence control device. An operator sets the sequence control device by an operation input to the indicator.

The sequence control device is operated based on a sequence control program, and the indicator is operated based on an HMI control program.

In the aforementioned sequence control program and HMI control program, operation simulations are generally executed before the programs are installed to the control machine or the indicator. Besides, debugging or the like of each program is executed by the simulation.

For example, as this simulation program, in patent literature 1 (Japanese Patent Application Laid-Open No. 2012-194632), a simulation program for debugging a control program (a sequence control program) of a controller is recited. Similarly, various simulation

SUMMARY

Problems to be Solved

However, target process of a sequence control program and an HMI control program are completely different, and thus a simulator for the sequence control program and a simulator for the HMI control program may be operated in different processes, and furthermore, may be operated in different OSs.

In this case, the sequence control program and the HMI control program are debugged separately. That is, the sequence control program and the HMI control program cannot be synchronized and debugged. Therefore, for example, when a breakpoint is set in the simulation of the sequence control program, the simulation of the sequence control program is stopped, but the simulation of the HMI control program is not stopped at a corresponding place.

Therefore, it is hard to carry out efficient debugging between the sequence control program and the HMI control program.

Thus, the present invention aims to provide a program development support technology by which the sequence control program and the HMI control program can be synchronized and simulated.

Means to Solve Problems

The program development support device of the present invention includes a sequence control editing unit, an HMI control editing unit, and an integration simulation management unit. The sequence control editing unit edits a sequence control program. The HMI control editing unit edits an HMI control program. The integration simulation management unit manages synchronization of a simulation of the sequence control program executed by a sequence control simulator and a simulation of the HMI control program executed by an HMI control simulator, and according to a breakpoint set to one of the sequence control program and the HMI control program, execution of the simulation of the sequence control program is stopped by the sequence control simulator and execution of the simulation of the HMI control program is stopped by the HMI control simulator. The integration simulation management unit includes a variable management unit. The variable management unit exchanges common variables between the sequence control program and the HMI control program between the sequence control simulator that executes the simulations of the sequence control program and the HMI control simulator that executes the simulation of the HMI control program.

In this configuration, as the simulations proceed, the variable set in the sequence control program is passed to the HMI control program, and the variable set in the HMI control program is passed to the sequence control program.

In addition, in the program development support device, the breakpoint is a conditional breakpoint, and the integration simulation management unit includes a feedback processing unit. The feedback processing unit detects, from a variable when the simulation of the sequence control program is stopped at a conditional breakpoint, a code of the HMI control program in which the variable is set.

In this configuration, even if a stop factor of the sequence control program is in the HMI control program, the code of the HMI control program which becomes the stop factor is detected.

In addition, in the program development support device, the integration simulation management unit displays call stack information including variables detected in the feedback processing unit and related information of the variables.

In this configuration, the stop factor is visually recognized by a programmer.

In addition, in the program development support device, the integration simulation management unit moves an editing point of the HMI control program to the code of the HMI control program which is detected by the feedback processing unit.

In this configuration, editing for the stop factor becomes easy.

Effect

According to the present invention, the sequence control program and the HMI control program can be synchronized and simulated.

DESCRIPTION OF THE EMBODIMENTS

Figure 1:
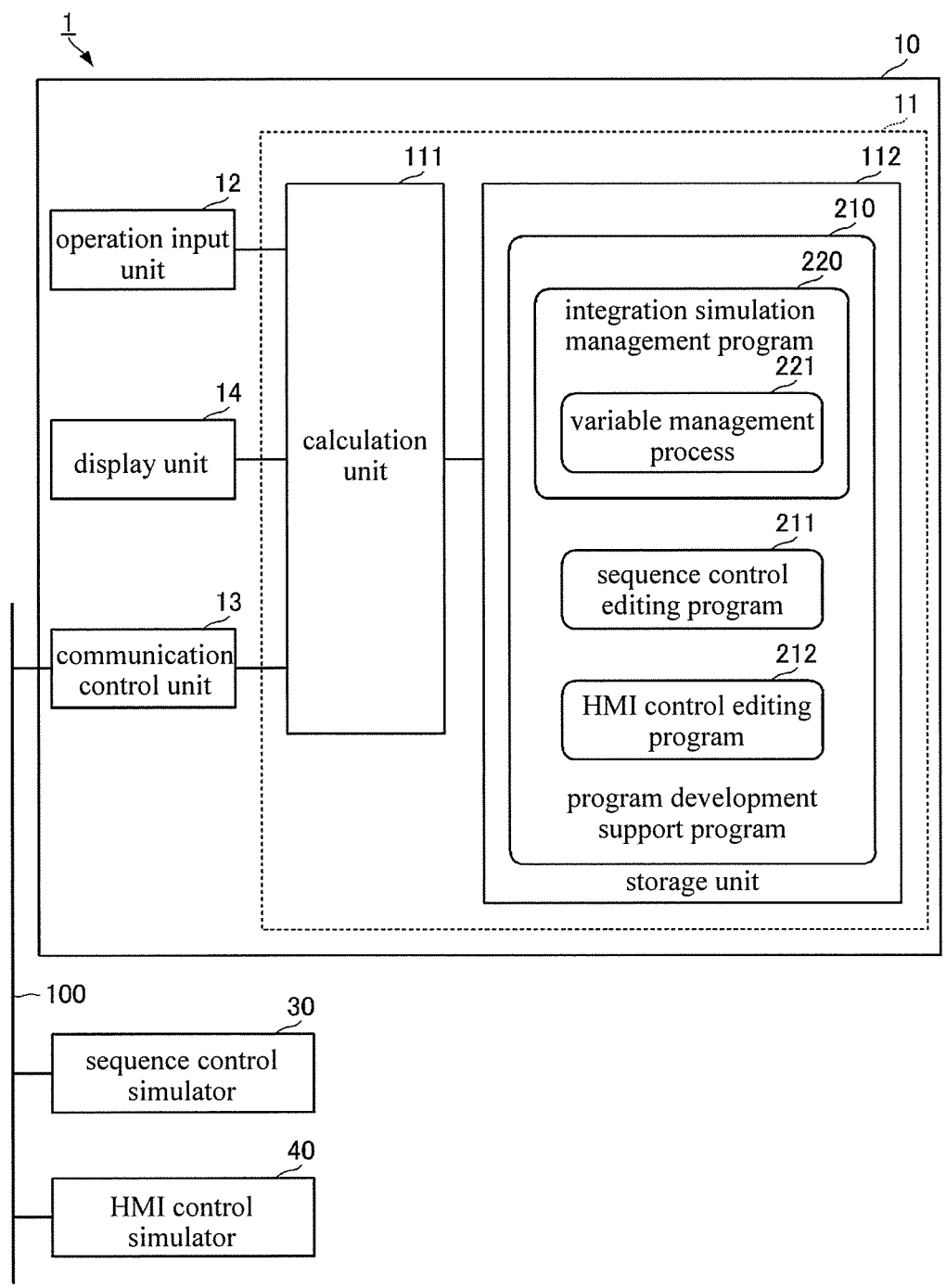
FIG. 1 is a schematic configuration diagram of an information processing device and a program development support system which include a program development support device according to a first embodiment of the present invention.

A program development support technology according to the first embodiment of the present invention is described with reference to diagrams. FIG. 1 is a schematic configuration diagram of an information processing device and a program development support system which include a program development support device according to the first embodiment of the present invention.

As shown in FIG. 1, a program development support system 1 includes an information processing device 10, a sequence control simulator 30, an HMI control simulator 40, and a network 100. The information processing device 10, the sequence control simulator 30, and the HMI control simulator 40 are connected by the network 100. The information processing device 10, the sequence control simulator 30, and the HMI control simulator 40 can communicate data with one another via the network 100.

The information processing device 10 includes a program development support unit (or program development support device) 11, an operation input unit 12, a communication control unit 13, and a display unit 14. The information processing device 10 is achieved by a personal computer or the like.

The operation input unit 12 is, for example, a mouse or a keyboard. A programmer receives various operations and input to the program development support unit 11 using the operation input unit 12.

The communication control unit 13 is connected to the network 100. The communication control unit 13 controls data communication to the sequence control simulator 30 and the HMI control simulator 40 in the information processing device 10. In addition, the communication control unit 13 controls communication with a sequence control device (illustration is omitted).

Figure 2:
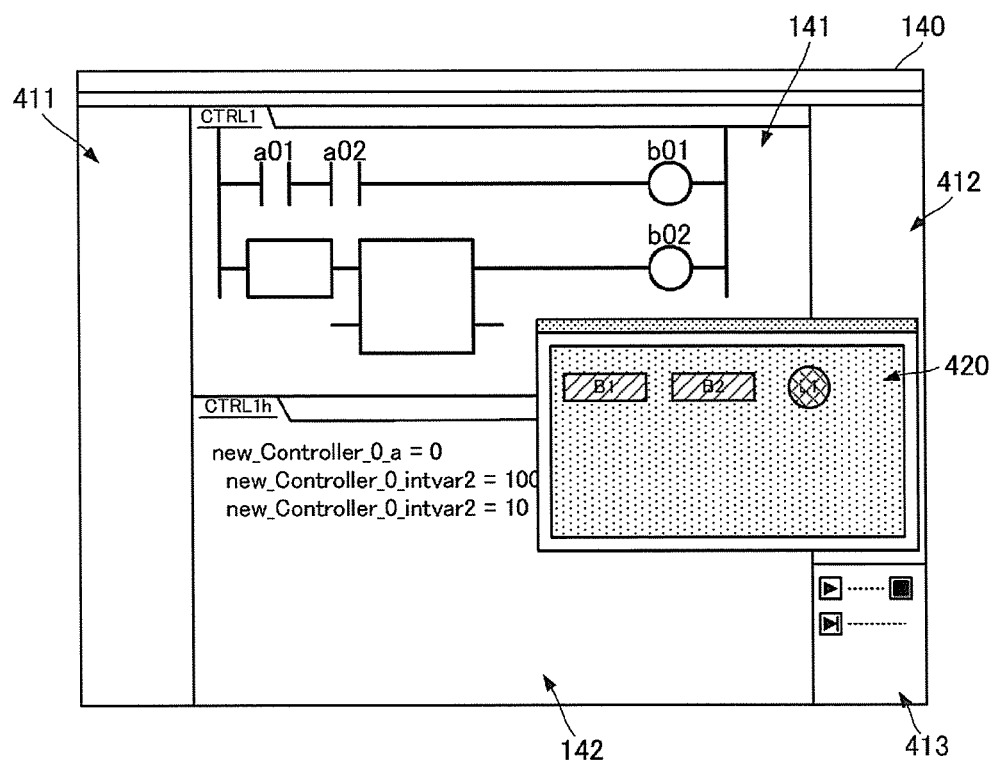
FIG. 2 is a diagram showing one example of a display screen of the information processing device.

The display unit 14 is, for example, a liquid crystal display or the like. The display unit 14 displays images from the program development support unit 11. For example, at the time of editing and simulating a sequence control program and an HMI control program, an image as shown in FIG. 2 is displayed in the display unit 14. FIG. 2 is a diagram showing an example of a display screen of the information processing device. As shown in FIG. 2, on a display screen 140, a sequence control program editing window 141, an HMI control program editing window 142, a multi-view explorer window 411, a tool box window 412, a simulation operation window 413, and an HMI screen display window 420 are displayed. Furthermore, the simulation operation window 413 and the HMI screen display window 420 are displayed on the display screen 140 when operation input of the simulation is carried out. Furthermore, positions and sizes of these multiple windows on the display screen 140 can be changed by the operation input unit 12.

The program development support unit 11 includes a calculation unit 111 and a storage unit 112. In the storage unit 112, a program development support program 210 is stored. The program development support program 210 has a sequence control editing program 211, an HMI control editing program 212, and an integration simulation management program 220. In the integration simulation management program 220, variable management process 221 is included.

The calculation unit 111 reads the sequence control editing program 211 from the storage unit 112 and executes the sequence control editing program 211. In this way, a "sequence control editing unit" of the application is achieved. The sequence control editing program 211 is a program which carries out creation and edition of the sequence control program, and the creation state and the edition state are displayed in the above sequence control program editing window 141.

The calculation unit 111 reads the HMI control editing program 212 from the storage unit 112 and executes the HMI control editing program 212. In this way, a "HMI control editing unit" of the application is achieved. The HMI control editing program 212 is a program which carries out creation and edition of the HMI control program, and the creation state and the edition state are displayed in the above HMI control program editing window 142.

In the sequence control program and the HMI control program, global variables are set. Controls by the sequence control program, and display and setting by the HMI control program are associated by the global variables. Besides, the sequence control program and the HMI control program can be synchronized using the global variables.

The calculation unit 111 reads the integration simulation management program 220 from the storage unit 112 and executes the integration simulation management program 220. In this way, an "integration simulation management unit" of the application is achieved. In addition, the calculation unit 111 executes the variable management process 221 of the integration simulation management program 220, and thereby a "variable management unit" of the application is achieved.

The integration simulation management unit executes the simulation of the sequence control program edited by the sequence control editing unit and the HMI control program edited by the HMI control editing unit. Besides, transition of display on an HMI caused by the simulation is displayed on the above HMI screen display window 420. In addition, by the operation input of an execute button, a pause button, a step execution button or the like of the simulation operation window 413, the integration simulation management unit manages execution of the simulations or the like.

At this time, the integration simulation management unit manages synchronization of runtime of the sequence control program determined by the sequence control simulator 30 and runtime of the HMI control program determined by the HMI control simulator 40. The management of the synchronization here means that each program is executed while checking the exchanging of common variables of mutual programs. The variable management process 221 is used in the management of the synchronization.

Figure 3:
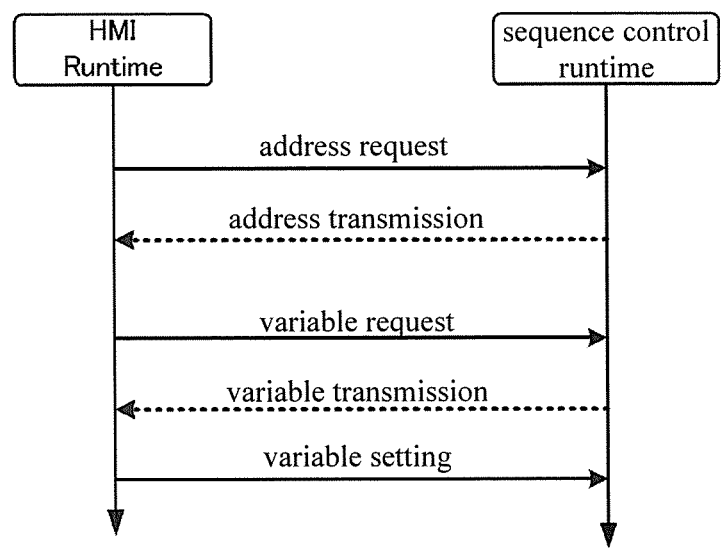
FIG. 3 is a diagram showing a concept of variable management.

FIG. 3 is a diagram showing a concept of the variable management. FIG. 3 shows a case of carrying out setting of a variable from the runtime of HMI control program (HMI runtime) to the runtime of the sequence control program (sequence control runtime). The HMI runtime is the runtime in which the HMI control program is executed by simulation in the HMI control simulator 40, and the sequence control runtime is the runtime in which the sequence control program is executed in the sequence control simulator 30.

If the integration simulation management unit receives an address request for variable setting from the HMI control simulator 40, the address request is converted to a specification of the sequence control simulator 30 and passed to the sequence control simulator 30. In this way, the address request from the HMI runtime to the sequence control runtime is executed.

If the integration simulation management unit receives address transmission for variable setting from the sequence control simulator 30, the address transmission is converted to a specification of the HMI control simulator 40, and the address is passed to the HMI control simulator 40. In this way, the address transmission from the sequence control runtime to the HMI runtime is executed.

In the following, communication relating to variable setting between the HMI control simulator 40 and the sequence control simulator 30 is managed by the integration simulation management unit, and specification conversion is appropriately carried out. In this way, the variable request from the HMI runtime to the sequence control runtime, the variable transmission from the sequence control runtime to the HMI runtime, and the variable setting from the HMI runtime to the sequence control runtime are executed in this order. That is, the exchange of common variables by the HMI control program and the sequence control program is carried out.

By this configuration and this process, even if the sequence control simulator 30 and the HMI control simulator 40 are executed in different processes, and furthermore in different OSs, the sequence control runtime and the HMI runtime can be synchronized. That is, the simulation of the sequence control program and the simulation of the HMI control program can be carried out synchronically.

In addition, by enabling this synchronization, when the breakpoint (a conditional breakpoint of the present invention) is set in one of the programs, both programs can be paused corresponding to the breakpoint. The conditional breakpoint is a point on the runtime (execution process of the program) at which a condition is set and the programs are stopped when the condition is satisfied, or the programs are stopped when the condition is not satisfied.

Figure 4:
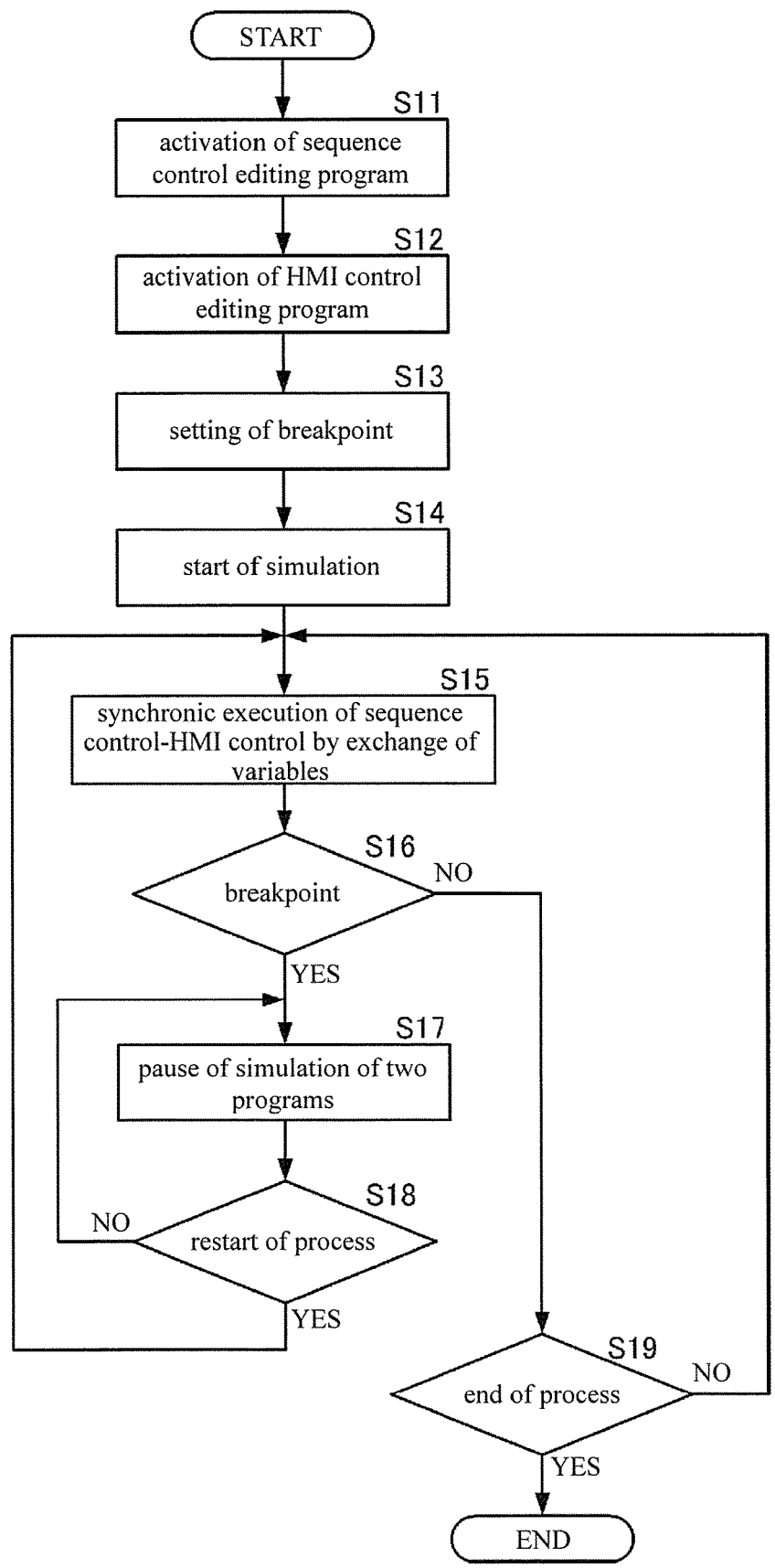
FIG. 4 is a flow chart of simulation for setting a breakpoint in a program development support method according to an embodiment of the present invention.

FIG. 4 is a flow chart of simulation for setting the breakpoint in a program development support method according to the embodiment of the present invention.

The program development support unit 11 activates the sequence control editing program (S11) and activates the HMI editing program (S12). Here, activation of the programs means the programs are put into a state to be capable of being simulated.

The program development support unit 11 sets the breakpoint for the runtime of the sequence control editing program or the runtime of the HMI editing program (S13).

The program development support unit 11 starts the simulations according to the operation input to the simulation operation window 413 (S14). The program development support unit 11 synchronizes the sequence control and the HMI control and executes the simulations by the passing of the variables (the global variables) recorded in the two programs (S15).

If the breakpoint is detected (S16: YES), the program development support unit 11 pauses the simulations of the two programs corresponding to the breakpoint (S17). For example, the program development support unit 11 pauses the simulations of the two programs with reference to the variables used by the breakpoint.

If restart of the simulations is selected (S18: YES), the program development support unit 11 returns to step S15 and synchronizes the sequence control and the HMI control to execute the simulations. Furthermore, the program development support unit 11 returns to step S17 and keeps the pause state in a period when the restart of the simulations is not selected (S18: NO).

If the breakpoint is not detected (S16: NO), the program development support unit 11 returns to step S15 and continues the simulation until the end of the simulations is detected (S19: NO), and the integration simulation is ended by detecting the end of the simulations (S19: YES).

By the use of this process, even if the breakpoint is set in one of the programs, the simulations of the two programs are paused according to the breakpoint. In other words, it can be prevented that only the simulation of the program in which the breakpoint is set is paused and the simulation of the program in which the breakpoint is not set is still executed without stop.

In this way, integrated debugging of the sequence control program and the HMI control program becomes easy, leading to improvement of a program development speed.

Figure 5:
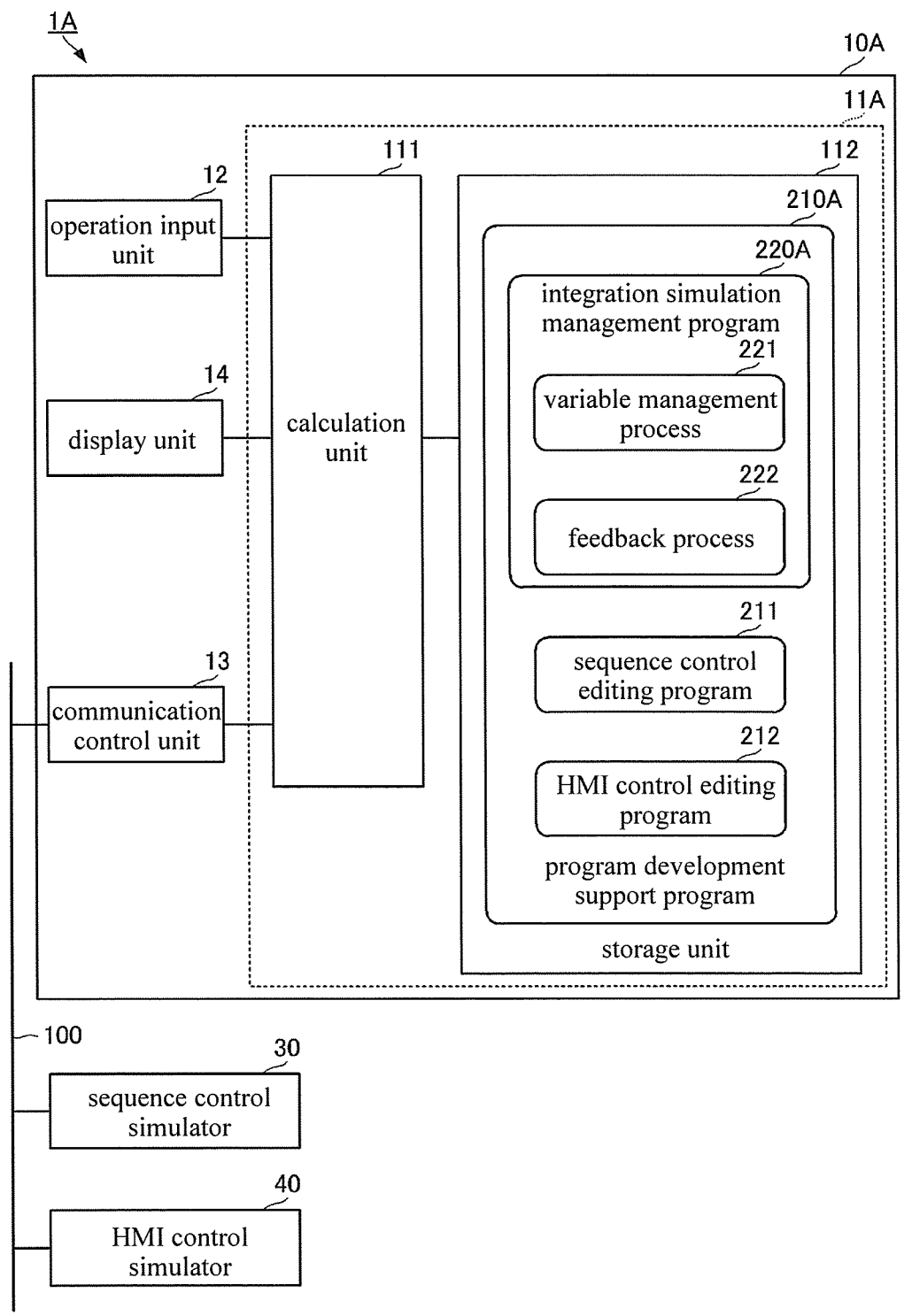
FIG. 5 is a schematic configuration diagram of an information processing device and a program development support system which include a program development support device according to a second embodiment of the present invention.

Next, a program development support technology according to a second embodiment of the present invention is described with reference to diagrams. FIG. 5 is a schematic configuration diagram of an information processing device and a program development support system which include the program development support device according to the second embodiment of the present invention.

A program development support unit 11A according to the second embodiment is different form the program development support unit 11 according to the first embodiment in that feedback process of the breakpoint of the simulation is added. Other configurations of the program development support unit 11A are the same as that of the program development support unit 11, and description of the same places is omitted.

More specifically, feedback process 222 is included in an integration simulation management program 220A of a program development support program 210A. A calculation unit 111 reads and executes the feedback process 222, and thereby a "feedback processing unit" of the application is achieved.

Figure 6:
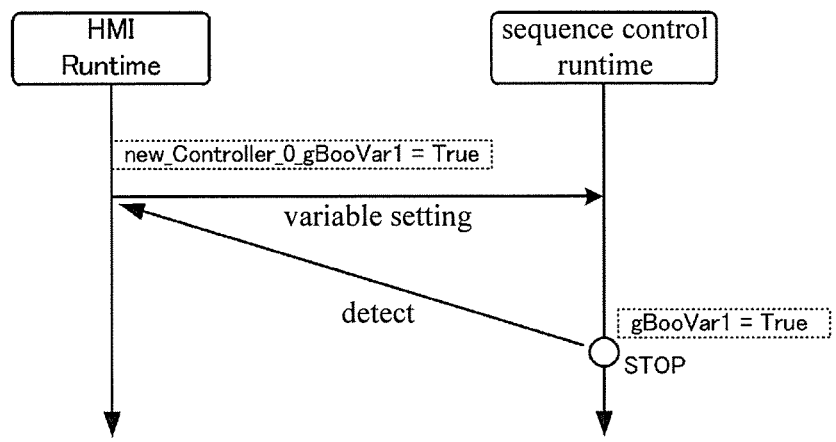
FIG. 6 is a diagram showing a concept of a feedback process.

FIG. 6 is a diagram showing a concept of the feedback process. As shown in FIG. 6, the feedback processing unit detects, when stop (STOP) occurs at a conditional breakpoint of sequence control runtime, a variable which is the stop factor in the sequence control program corresponding to the sequence control runtime. Moreover, the feedback processing unit detects a code (a so-called source code) of the HMI control program related to the variable of the stop factor and setting of the variable. In this way, the programmer can easily grasp the stop factor at the conditional breakpoint and can easily carry out debugging of the sequence control program.

Figure 7:
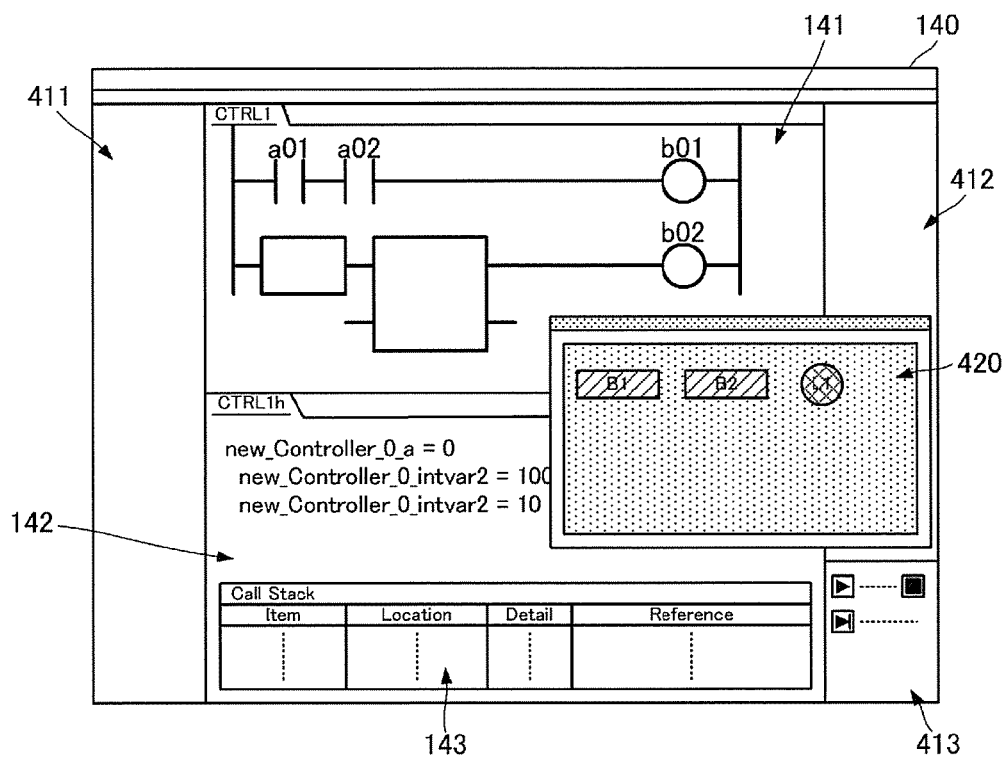
FIG. 7 is a diagram showing one example of a display screen including a call stack.

The integration simulation management unit which is achieved by the integration simulation management program 220A is displayed as one item of a call stack including the detected variable and related information of the variable. The related information of the variable may be, for example, values set for the variable, data types or the like. The call stack is information showing where to return at the time of returning to a calling side when multiple programs are executed. FIG. 7 is a diagram showing one example of a display screen including the call stack. As shown in FIG. 7, the call stack is displayed in a call stack display window 143. Each item displayed in the call stack display window 143 can be selected by the operation of the operation input unit 12. If an item displayed in the call stack display window 143 is selected, an integration simulation management unit moves the code of the program related to a selected item to an editing point.

In this way, the programmer can further easily carry out the debugging of the sequence control program.

Figure 8:
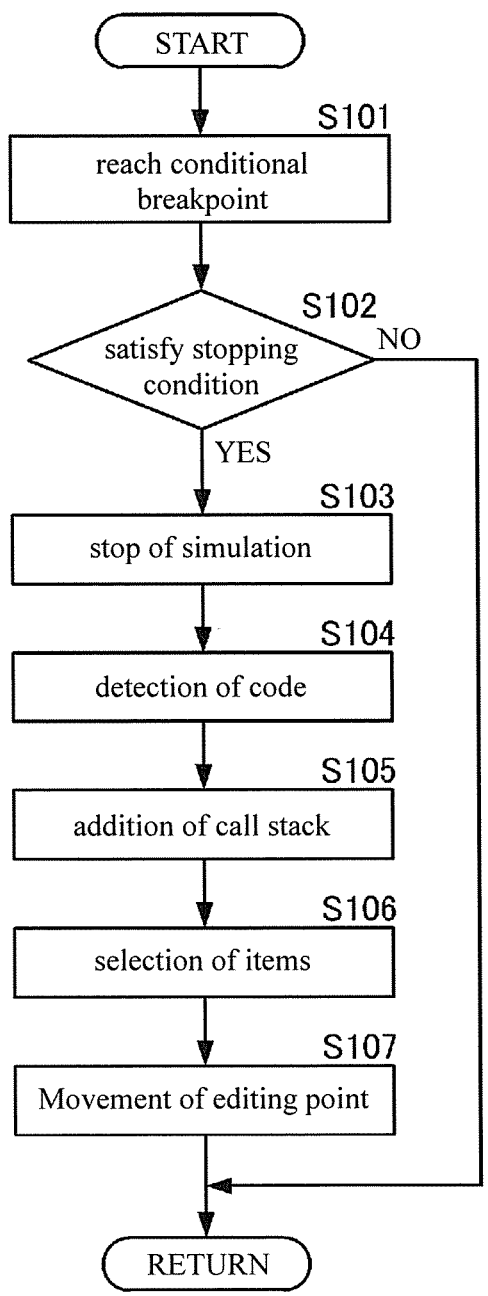
FIG. 8 is a flow chart showing the feedback process for a conditional breakpoint in the program development support method according to the embodiment of the present invention.

An overall process flow is as shown in FIG. 8. FIG. 8 is a flow chart showing the feedback process for a conditional breakpoint in the program development support method according to the embodiment of the present invention.

The integration simulation management unit detects whether a stop condition is satisfied (S102) when the conditional breakpoint is reached (S101). If the integration simulation management unit detects that the stop condition is satisfied (S102: YES), the simulations are stopped, that is, the sequence control runtime and the HMI runtime are stopped (S103). Furthermore, if the integration simulation management unit detects that the stop condition is not satisfied (S102: NO), the simulations are continued.

After the simulations are stopped (S103), the integration simulation management unit detects the code in which the variable being the stop factor is set (S104). The integration simulation management unit adds the detected variable and the related information of the variable as one item of the call stack (S105) and displays the variable and the related information.

If the item of the call stack is selected (S106), the integration simulation management unit moves the editing point (S107).

What is claimed is:

1. A program development support device, comprising:
a processor configured to:
edit a sequence control program;
edit an human machine interface (HMI) control program; and
manage synchronization of a simulation of the sequence control program executed by a sequence control simulator and a simulation of the HMI control program executed by an HMI control simulator,
wherein the
processor is configured to manage the synchronization by exchanging common variables between the sequence control program and the HMI control program between the sequence control simulator that executes the simulation of the sequence control program and the HMI control simulator that executes the simulation of the HMI control program,
wherein the processor is configured to exchange the common variables by transmitting an address request, a variable request, and a variable setting from one of the sequence control program and the HMI control program to another one of the sequence control program and the HMI control program based on a specification of the another one of the sequence control program and the HMI control program, and by receiving an address transmission and a variable transmission from the another one of the sequence control program and the HMI control program to the one of the sequence control program and the HMI control program based on a specification of the one of the sequence control program and the HMI control program,
wherein, according to the exchanged common variables and a breakpoint set to the one of the sequence control program and the HMI control program, execution of the simulation of the sequence control program is stopped by the sequence control simulator and execution of the simulation of the HMI control program is stopped by the HMI control simulator.

2. The program development support device according to claim 1, wherein the breakpoint is a conditional breakpoint, and the
processor is configured to detect, from a variable when the simulation of the sequence control program is stopped at a conditional breakpoint, a code of the HMI control program in which the variable is set.

3. The program development support device according to claim 2, wherein the processor is configured to control a display to display call stack information comprising variables detected and related information of the variables.

4. The program development support device according to claim 3, wherein the processor is configured to move an editing point of the HMI control program to the code of the HMI control program which is detected.

5. The program development support device according to claim 2, wherein the processor is configured to move an editing point of the HMI control program to the code of the HMI control program which is detected.

6. The program development support system according to claim 5, wherein the processor is configured to move an editing point of the HMI control program to the code of the HMI control program which is detected.

7. A program development support system, comprising:
a sequence control simulator which executes a simulation of a sequence control program;
an human machine interface (HMI) control simulator which executes a simulation of an HMI control program; and
the program development support device according to claim 1,
wherein the program development support device, the sequence control simulator, and the HMI control simulator are connected by a communication network.

8. The program development support system according to claim 7, wherein the breakpoint is a conditional breakpoint, and the
processor is configured to detect, from a variable when the simulation of the sequence control program is stopped at a conditional breakpoint, a code of the HMI control program in which the variable is set.

9. The program development support system according to claim 8, wherein the processor is configured to control a display to display call stack information comprising variables detected and related information of the variables.

10. The program development support system according to claim 9, wherein the processor is configured to move an editing point of the HMI control program to the code of the HMI control program which is detected.

11. A program development support method, comprising:
a sequence control editing step in which a sequence control program is edited by a processor;
an human machine interface (HMI) control editing step in which an HMI control program is edited by the processor; and
an integration simulation management step in which a synchronization of a simulation of the sequence control program executed by a sequence control simulator and a simulation of the HMI control program executed by an HMI control simulator is managed by the processor, wherein in the integration simulation management process, common variables are exchanged between the sequence control program and the HMI control program between the sequence control simulator that executes the simulation of the sequence control program and the HMI control simulator that executes the simulation of the HMI control program,
wherein the common variables are exchanged by the processor by transmitting an address request, a variable request, and a variable setting from one of the sequence control program and the HMI control program to another one of the sequence control program and the HMI control program based on a specification of the another one of the sequence control program and the HMI control program, and by receiving an address transmission and a variable transmission from the another one of the sequence control program and the HMI control program to the one of the sequence control program and the HMI control program based on a specification of the one of the sequence control program and the HMI control program,
wherein, according to the exchanged common variables and a breakpoint set to the one of the sequence control program and the HMI control program, execution of the simulation of the sequence control program is stopped by the sequence control simulator and execution of the simulation of the HMI control program is stopped by the HMI control simulator.

12. A non-transitory computer-readable recording medium, storing a program development support program that makes an information processing device comprising a processor to execute:
a sequence control editing process for editing a sequence control program;
an human machine interface (HMI) control editing process for editing an HMI control program;
an integration simulation management process for managing synchronization of a simulation of the sequence control program executed by a sequence control simulator and a simulation of the HMI control program executed by an HMI control simulator; and
a variable exchanging process for exchanging common variables between the sequence control program and the HMI control program between the sequence control simulator that executes the simulation of the sequence control program and the HMI control simulator that executes the simulation of the HMI control program,
wherein the common variables are exchanged by the processor by transmitting an address request, a variable request, and a variable setting from one of the sequence control program and the HMI control program to another one of the sequence control program and the HMI control program based on a specification of the another one of the sequence control program and the HMI control program, and by receiving an address transmission and a variable transmission from the another one of the sequence control program and the HMI control program to the one of the sequence control program and the HMI control program based on a specification of the one of the sequence control program and the HMI control program,
wherein, according to the exchanged common variables and a breakpoint set to the one of the sequence control program and the HMI control program, execution of the simulation of the sequence control program is stopped by the sequence control simulator and execution of the simulation of the HMI control program is stopped by the HMI control simulator.

* * * * *